United States Patent [19]

Jenquin

[11] Patent Number: 5,442,810
[45] Date of Patent: Aug. 15, 1995

[54] TRACTOR-TRAILER ELECTRONIC TRANSMISSION PATH

[75] Inventor: Philip C. Jenquin, San Diego, Calif.

[73] Assignee: QUALCOMM Incorporated, San Diego, Calif.

[21] Appl. No.: 226,391

[22] Filed: Apr. 12, 1994

Related U.S. Application Data

[63] Continuation of Ser. No. 981,041, Nov. 24, 1992, abandoned.

[51] Int. Cl.⁶ ............................................. H04B 7/00
[52] U.S. Cl. ....................................... 455/66; 455/89; 455/99; 455/345; 174/47; 280/422
[58] Field of Search .................... 455/66, 95, 90, 99, 455/89, 345, 54.1; 213/1.3; 280/422, 421, 420; 340/825.060; 303/9.76; 174/47

[56] References Cited

U.S. PATENT DOCUMENTS

| | | | |
|---|---|---|---|
| H1,057 | 5/1992 | Regalia | 174/47 |
| 2,525,086 | 10/1950 | Wright | 174/47 X |
| 3,603,418 | 9/1971 | Schmidt et al. | 177/136 |
| 3,773,186 | 11/1973 | Reno et al. | 213/1.3 |
| 3,854,540 | 12/1974 | Holmstrom, Jr. | 177/136 |
| 4,041,470 | 8/1977 | Slane et al. | 364/900 |
| 4,086,576 | 4/1978 | Jebb et al. | 340/272 |
| 4,234,926 | 11/1980 | Wallace et al. | 364/551 |
| 4,328,494 | 5/1982 | Goodall | 340/870.18 |
| 4,505,344 | 3/1985 | Hobbs et al. | 177/136 |
| 4,553,723 | 11/1985 | Nichols et al. | 246/167 |
| 4,663,725 | 5/1987 | Truckenbrod et al. | 364/505 |
| 4,797,948 | 1/1989 | Milliorn et al. | 455/54 |
| 4,804,937 | 2/1989 | Barbiaux et al. | 340/52 F |
| 4,831,558 | 5/1989 | Shoup et al. | 364/550 |
| 4,885,563 | 12/1989 | Johnson et al. | 340/310 A |
| 4,885,564 | 12/1989 | Vercellotti et al. | 340/310 A |
| 4,896,277 | 1/1990 | Vercellotti et al. | 364/551.01 |
| 4,897,642 | 1/1990 | DiLullo et al. | 340/825.060 |
| 5,025,253 | 6/1991 | DiLullo et al. | 340/825.06 |
| 5,172,958 | 12/1992 | Sell | 303/9.76 |

OTHER PUBLICATIONS

Brochure entitled "50 Ways to Touch Memory", by Dallas Semiconductor, pp. 1-7, 35-38, Mar. 1992.

*Primary Examiner*—Edward F. Urban
*Assistant Examiner*—Philip J. Sobutka
*Attorney, Agent, or Firm*—Russell B. Miller

[57] ABSTRACT

An electrical signal transmission path is provided along the air brake hose line to provide a dedicated connecting path between communication units on a tractor and trailer. A conductive line extends along the length of the air brake hose and is connected at one end to the communication unit on a tractor via a conductive linkage. The opposite end of the line is connected to a trailer communication unit via a conductive connection from the trailer end of a two part releasable air hose coupling which is isolated from the trailer and electrically connected to the trailer end of the conductive line.

11 Claims, 2 Drawing Sheets

TRACTOR-TRAILER ELECTRONIC TRANSMISSION PATH

This is a continuation of application Ser. No. 07/981,041, filed Nov. 24, 1992, now abandoned.

BACKGROUND OF THE INVENTION

The present invention relates to a tractor-trailer data transmission path or link forming part of a mobile communication system to allow data transmission back and forth between a tractor and attached trailer for subsequent transmission to a remote monitoring center.

Mobile communication systems are used by commercial trucking companies to locate, identify and ascertain status of their vehicles, as well as to allow the vehicle operator to send and receive information. One major problem facing large trucking companies is keeping track of the location of all trailers throughout the country. When trailers are unhooked from a tractor, they are liable to be left at a location and potentially forgotten. This results in unnecessary down time and substantial economic impact on the company.

In addition to keeping track of the location of all trailers at all times, it is also desirable to be able to ascertain the condition of trailer equipment, environmental conditions in a trailer, as well as the condition of the payload. This may be achieved by placing various sensors in the trailer. The sensors are typically connected to a suitable memory unit in the trailer in which trailer identification and cargo information is stored, and the sensor outputs as well as the trailer identification must be transmitted to the tractor over a suitable transmission medium. Trailer information is therefore transmitted to the tractor for transmission to a central facility where the information is monitored. Up to now, various transmission mediums have been contemplated including RF transceivers, infrared transceivers, dedicated wiring, and a sharing of existing wiring. RF and infrared transmission schemes can be costly and susceptible to interference. Dedicated wiring are not desired since additional connectors or a complete rewiring of existing trailers would be required. The preferred technique has been directed towards transmitting the information from trailer to tractor via existing tractor-trailer electrical wiring which provides power for the trailer lights as well as for equipment in the trailer. However, when the information signal is modulated onto a carrier and impressed upon the electrical power line, it is sometimes not easy to pick out the signal.

One tractor-trailer communication system of this type is described in application Ser. No. 07/620,133, filed Nov. 30, 1990, of Moallemi et al., which is a Continuation of application Ser. No. 07/339,686, filed Apr. 18, 1989, now U.S. Pat. No. 5,142,278 issued Aug. 25, 1992, the disclosure of which is incorporated by reference.

SUMMARY OF THE INVENTION

It is an object of the present invention to provide a new and improved tractor-trailer data transmission path to allow information to be transmitted more readily between a tractor and one or more attached trailers.

According to the present invention, a tractor-trailer data transmission path is provided which comprises a conductive line extending along the length of a tractor-trailer air brake hose, a connector at the trailer end of the line for electrically connecting the line to an information storage and transmission unit on or in the trailer, and a connector at the tractor end of the line for electrically connecting the line to receiver unit in the tractor.

Some existing hoses have embedded wire braiding for added strength, and may be used in a tractor/trailer air brake system. In this case, the existing wire braiding may be used as the connecting line, with suitable electrical connections to the braiding at the opposite ends of the line. Alternatively, where the brake hoses are coiled rubber hoses, a wire braid may be run along the length of a hose to provide the conductive line. Furthermore, in unbraided hoses an insulated wire strand or strands may be run the length of the hose.

This arrangement allows one or more electrical lines to be dedicated to tractor-trailer data communications, allowing signals to be transmitted more easily and reliably.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

Figure 1:
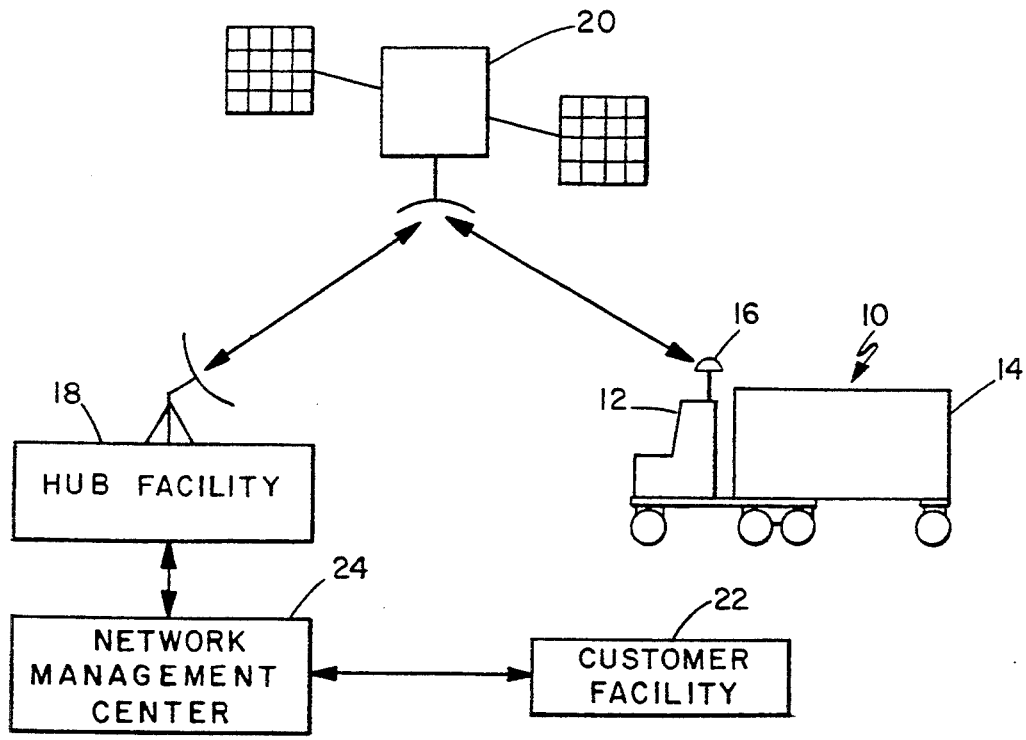
FIG. 1 is a block diagram of one type of mobile communication system in which the communication link of this invention may be used.

FIG. 1 illustrates one type of mobile communication system in which the data transmission link of this invention may be used. As illustrated in FIG. 1, a mobile communications terminal (not shown) is mounted in a vehicle such as a truck 10 having a tractor 12 and at least one trailer 14. Clearly the truck 10 may have more than one trailer connected in series. The mobile communication terminal in the truck 10 is connected to a suitable transmitter or antenna 16 for transmitting information to a central hub facility or terminal 18 in any suitable manner, for example via satellite 20. Information received from various trucks is transmitted in any conventional manner from the hub facility 18 to a customer facility 22 via network management center 24 which controls the priority, access, accounting and transfer characteristics of the message data. Messages can be transmitted to and from the truck 10 using such a system. Typically, the messages transmitted from the truck include information such as vehicle location, vehicle status, trailer identification and trailer status, as well as other information and requests for information which may be entered manually by the truck driver. A mobile communication system of this type is described in U.S. Pat. No. 5,142,278 referred to above in which the tractor-trailer existing power line was contemplated as the transmission medium. An example of such a communication system is that of the OmniTRACS system employing OmniTRACS mobile communications terminals, both of Qualcomm Incorporated of San Diego, Calif.

Figure 2:
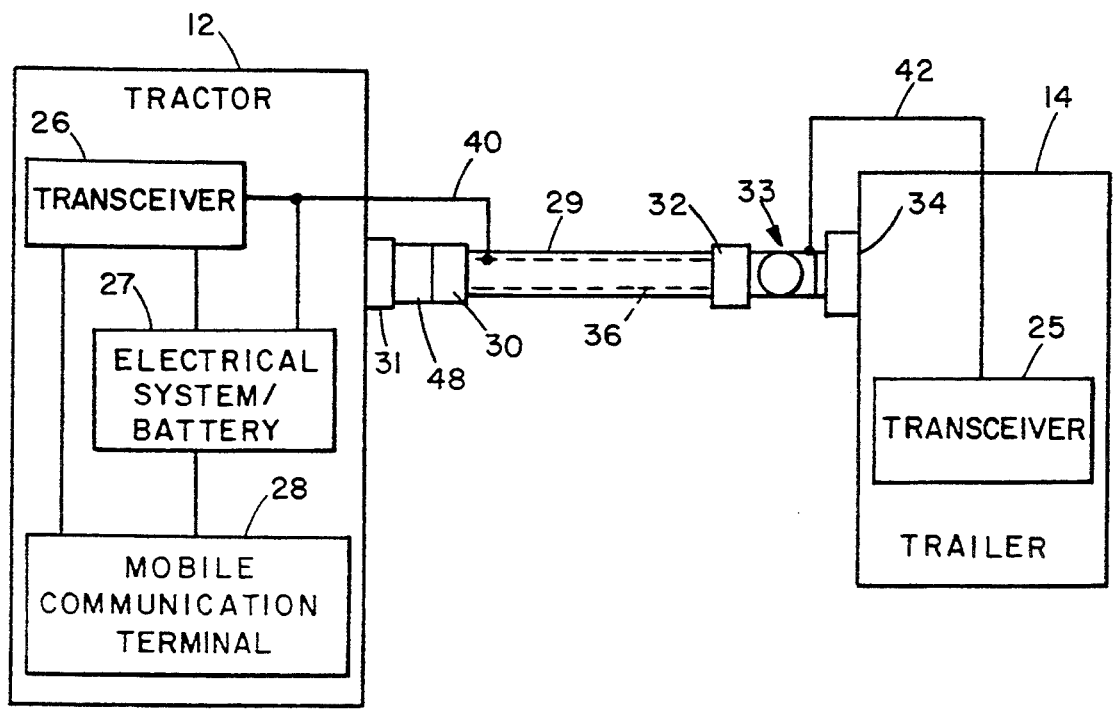
FIG. 2 is an illustration of a tractor-trailer data transmission link according to a preferred embodiment of the present invention.

In order for the terminal in tractor 12 to collect information on trailer identification and status for transmission to a central facility, a transmission path must be provided between the tractor and the trailer to allow electronic communication. FIG. 2 illustrates a trailer-tractor communication link or transmission path according to an exemplary embodiment of the present invention which does not require any additional electrical cables to be provided from the tractor to the trailer but which provides a dedicated path for communications between the tractor and trailer.

The tractor-trailer communication system basically comprises a transmitter unit 25 mounted on or in the trailer. Unit 25 will include a memory in which trailer identifying information is stored, and is designed to generate a carrier signal that is modified by a trailer identifying signal as well as any other information such as trailer or payload status information, which is obtained from various sensors linked to unit 25. Every trailer in a fleet will have a transmitter unit designed to transmit its own specific identifying signal.

The tractor includes a receiver unit 26 for receiving information from the transmitter unit when the tractor is hooked up to a trailer. The receiver unit receives power from the vehicle electrical system/battery 27, and is linked to a mobile communication terminal 28 in the tractor. The receiver receives each identification signal modulated carrier signal transmitted from the trailer transmitter unit and demodulates the signal to provide an information or identification signal to the mobile communication center 28. The identification signal is then transmitted to the central or hub facility.

In using the transmitter such as described in U.S. Pat. No. 5,142,278, a power bus or electrical transmission path must be provided from the transmitter unit in the trailer to the tractor receiver unit in order to allow signal communications between these units. In the aforementioned patent the power bus is used such that power is provided from the system/battery to transmitter 25 for powering the unit. Up to now, tractor-trailer communication has been via the existing power cable linkage between the tractor and trailer for powering brake lights and other electrical equipment in the trailer. This invention provides a dedicated line for carrying the modulated carrier signal from the trailer to the tractor.

In an alternate embodiment the transmission path between the tractor and trailer need not be a power bus. Therefore, electrical system/battery 27 would not be connected to the transmission medium as illustrated in FIG. 2. In either embodiment a common ground is shared between the tractor and trailer such that only one wire is needed to complete the transmission path.

In one example of this alternate embodiment, transmitter 25 is configured as a transceiver, receiving power from the power bus, and transmitting and receiving its signals over the transmission medium. Similarly receiver 26 is also configured as a transceiver for transmitting and receiving over the transmission medium. In this example, transceiver 26 generates a generic interrogation signal to which transceiver responds with an identification signal. Later transceiver 26 interrogates transceiver 25 using a signal based upon the I.D. of transceiver 25. In the case of multiple trailer transceivers 25 a search protocol is used by transceiver 26 upon receiving responses from multiple trailer transceivers 25. Again the trailer transceivers 25 respond to the transceiver specific signals transmitted by transceiver 26.

In a tractor-trailer combination, air brake lines or hoses 29 are releasably connected between the tractor 12 and the trailer 14 to supply air to the trailer. Typically, each line 29 has a coupling or fitting 30 at the tractor end which is screwed into an inlet or fitting 31 at the back of the tractor. A similar fitting 32 at the opposite end is screwed onto one part of a releasable coupling device 33 which is known as a "glad hand" at the trailer end for releasably securing the hose to an inlet 34 at the front end of the trailer. Inlet 34 is linked via suitable means to the trailer brake system. One or more, typically two, such air brake hoses or lines are provided between the tractor and trailer, and similar hoses are provided between the first trailer and any subsequent trailer linked to the tractor where the tractor is pulling more than one trailer. When an operator hitches the tractor to a trailer, they connect the air brake hose to the trailer air brake inlet in a conventional manner.

Figure 4:
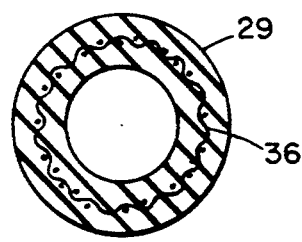
FIG. 4 is a section on the lines 4—4 of FIG. 3.

Some existing air brake hoses are of the wire braided type in which a metallic sheath 36 is embedded in a rubber or plastic hose 29 for added strength and durability. Although a metallic sheath is preferred since currently existing hoses are manufactured in this arrangement, it should be understood that in the alternative a wire strand embedded in the hose or an insulated wire strand mounted alongside the hose may be used. An air brake hose of this type is illustrated in FIG. 4. In the illustrated embodiment of this invention, the embedded metallic sheath 36 of a tractor-trailer air brake hose 29 is used as part of the electrical communications path between the transmitter unit 25 in a trailer and the receiver unit 26 in a tractor, as best illustrated in FIG. 2.

Figure 3:
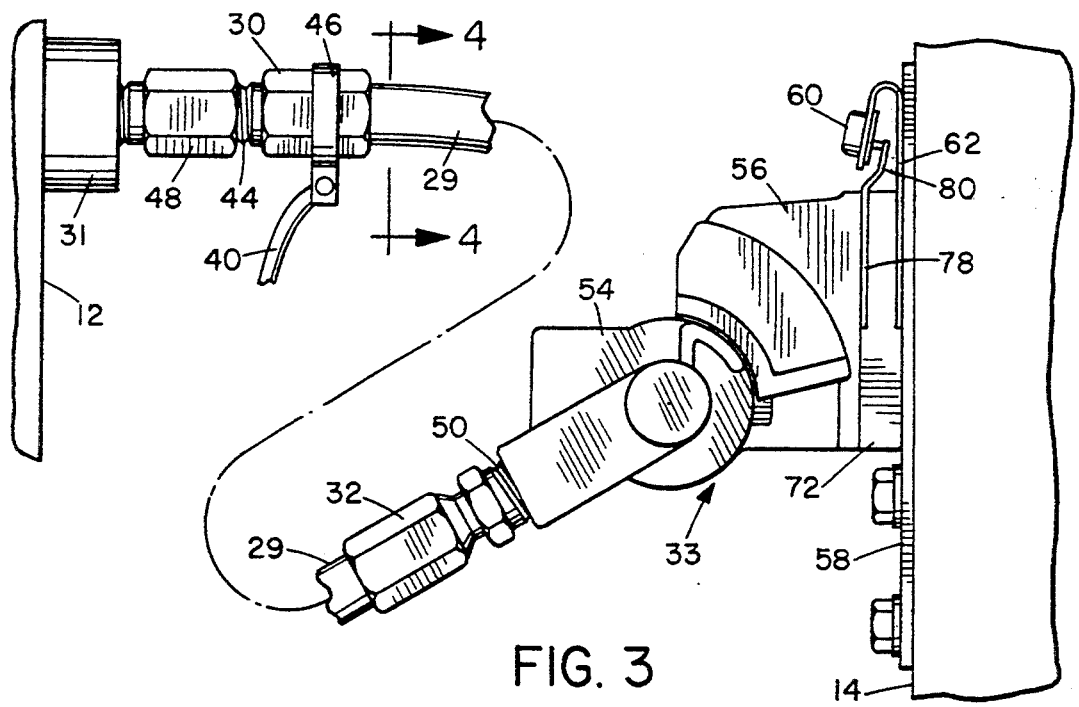
FIG. 3 is a side elevational view, partly broken away, of a tractor-trailer air brake hose incorporating the transmission link of FIG. 2.

As illustrated schematically in FIG. 2, a suitable electrical line 40 is connected between the receiver unit in the tractor and the metallic sheath 36 at the tractor end of the air hose. Similarly, an electrical connecting line 42 is provided between the trailer end of the sheath 36 and the transmitter unit 25 in the trailer. The data transmission path is illustrated in more detail in FIGS. 3-6. As illustrated in FIG. 3, the coupling or fitting 30 at the tractor end of the hose is of metal such as brass and is suitably secured on the end of the hose. Fitting 30 has a projecting threaded end 44 for threaded engagement in tractor inlet 48. The metal fitting 30 will be electrically connected to the metallic sheath 36 at the end of the hose in a similar manner to insulated electrical cables, by peeling back a short portion of the insulating cladding of the hose before securing the exposed end to fitting 30. Electrical wiring 40 is connected to the fitting 30 at one end via a suitable clamping device 46, as illustrated in FIG. 3, and extends through the rear wall of the tractor for connection to the receiver unit as generally illustrated in FIG. 2. Fitting 30 is electrically isolated from the tractor brake outlet fitting 31 via insulating plastic coupling 48 or any other suitable insulating means such as an insulating bushing.

The metallic fitting 32 at the trailer end is mounted on the hose end and electrically connected to the trailer end of the metallic sheath in a similar manner to fitting 30. Fitting 32 has a projecting threaded end 50 which is inserted into a correspondingly threaded inlet 52 of one part 54 of the so-called "glad hand" connector 33 as is conventionally used to releasably connect air brake hoses to trailers. The other part 56 of the connector 33 is permanently mounted on mounting plate 58 at the front end of trailer 14 with an insulating layer disposed between part 56 and plate 58. The two parts 54, 56 have through bores for passage of air through the parts and are designed to be connected and disconnected by rotating part 54. This type of glad hand connection is well known in the field and will therefore not be described in any more detail. When the two parts 54, 56 are coupled together, a path for air from the air hose is provided through connector 33 and mounting plate 58 to the trailer air brake system.

Since the fitting 32 is in electrical contact with the trailer end of metallic sheath 36 (FIG. 4), and the glad hand is of metal, the trailer secured part 56 of the glad hand is electrically connected to sheath 36. Thus, the connecting lead to transmitter/transceiver unit 25 (FIG. 2) can be taken from the part 56 of the glad hand, and two exemplary alternative ways of doing this are illustrated in the drawings. In the alternative illustrated in FIGS. 3–6, the transmitter unit is configured as a transceiver and comprises a small memory and trailer id generating chip 60 which is mounted via mounting bracket 62 on the trailer mounting plate 58. Since mounting plate 58 is grounded, bracket 62 also acts as a ground lead for the chip 60.

Figure 5:
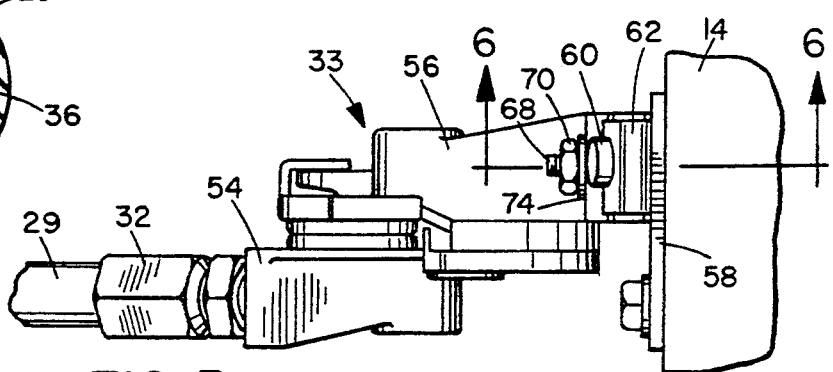
FIG. 5 is a top plan view of the trailer end of the link.
Figure 6:
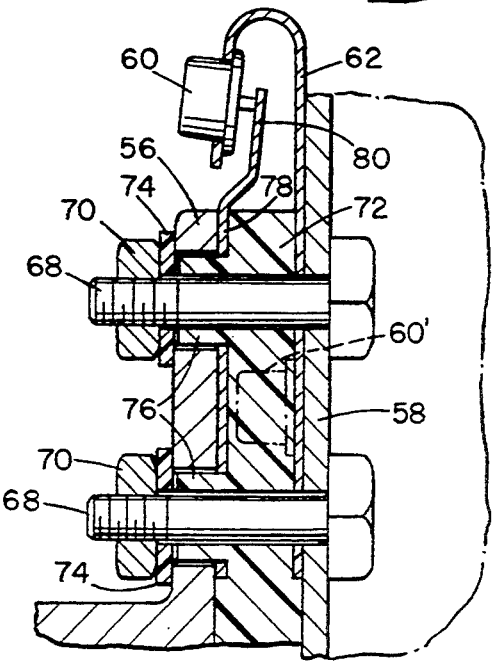
FIG. 6 is a section on the lines 6—6 of FIG. 5.

Since the glad hand connector 33 is metal, it must be isolated from the trailer mounting plate 58 to allow the electrical path to be taken from part 56. One way of doing this is illustrated in FIGS. 3, 5 and 6. As best illustrated in FIG. 6, connector part 56 is secured to mounting plate 58 via screws 68 which extend through the mounting plate and part 56 and have lock nuts 70 mounted at their free ends. In order to isolate the part 56 from the screws and the mounting plate 58, an isolating pad 72 of suitable insulating material is inserted between the mounting plate 58 and the connector part 56, and the screws 68 project through aligned openings in the plate 58, pad 72 and connector part 56. Insulating bushings 74 are mounted on the projecting ends of the screws between the nuts 70 and connector part 56. Projecting cylindrical bosses 76 project from pad 72 into enlarged openings in connector part 56 surrounding the screws so as to isolate the shank of each screw from the connector part. With this arrangement connector part 56 is completely isolated from the mounting plate 58, and fitting 32 is similarly isolated to prevent any signal losses to ground.

A signal path from the connector part 56 to the chip or transmitter unit 60 is provided via a conductive connecting plate or bracket 78 which is sandwiched between connector part 56 and pad 72 as illustrated in FIG. 6 and which has an upwardly projecting tab 80 which is connected to the live lead of chip 60, which may be a Touch Memory ® chip as manufactured by Dallas Semiconductors. Since chip 60 is exposed it may also be accessed by an operator with a touch interrogation device.

In this embodiment, the transmitter unit is a simple trailer identification unit which transmits trailer identifying information along the transmission path of hose 29 to the receiver unit on receipt of a request signal from the receiver unit 26 (FIG. 2) which is configured as a transceiver. However, in alternative embodiments, as illustrated schematically in FIG. 2, the transmitter unit 25, or multiple transmitter units, may be suitably mounted within the trailer adjacent the air brake hose mounting plate 68. The internally mounted transmitter unit may be secured to the isolated glad hand part 56 via a suitable electrical lead secured to the part 56 in any suitable manner, for example a lead may be connected to tab 80 of connecting bracket 78, and extend from tab 80 into the trailer for connection to unit 25.

Instead of mounting chip 60 externally on mounting bracket 62, a chip or transmitter unit 60′ may be embedded within pad 72, as illustrated in FIG. 6. In this case, the drip 60′ is protected from the surrounding environment. Alternatively, an embedded chip 60′ may be provided in addition to chip 60 for performing additional functions. Suitable connections will be provided from conductive plate 78 to chip 60′, or plate 78 may be omitted and chip 60′ may be connected directly to glad hand connector part 56.

Additional connecting wires (not illustrated) may connect transmitter unit 25 to sensors inside or outside the trailer for providing cargo status and other desired information via metal sheath 36 to the tractor receiver unit. The electrical connection to sensors and other electrical units in the trailer may use the trailer air brake hoses as part of the electrical path, in a similar manner to air brake hose 29 between the tractor and trailer. In any trailer, an air brake line will extend from the air brake inlet at the front end of the trailer to the trailer brake system. If this line has an embedded metallic sheath, it may be suitably connected to the transmitter unit with wiring, for example, and then may be connected to electrical units or sensors in the truck at any desired point in its length simply by tapping electrical leads into the hose at appropriate points. The brake end of the metallic sheath will be isolated in any suitable manner from any metal parts of the brake units.

With this arrangement, a dedicated transmission path is provided between a transmitter unit on or in a trailer and a receiver unit in a tractor using existing brake hose lines without requiring any additional electrical cables between the tractor and trailer. This allows more reliable signal transmission and signal identification. This arrangement also does not require any change in the way drivers connect trailers. No change is required in the existing seven-way, electrical connector between tractor-trailer or existing glad hands.

In the embodiment described above, the transmission path is provided along an air brake hose of the embedded wire sheath type. This type of air brake connection typically includes a pair of air brake hoses and a spring extending from the tractor for retracting the brake hose lines when released from the trailer. Thus, the electrical path could alternatively be provided along the metallic retraction spring in a similar manner, and an additional transmission path may be provided along the second air brake hose, since there are typically two such hoses connected between the tractor and coupled trailer. In tractors having coiled rubber air brake hoses without embedded metal sheaths, a conductive line could be simply mounted along the outside of the hose in any suitable manner, such as a metallic sheath or wire with an outer insulating layer, with the hose providing the support for the transmission path.

Although a preferred embodiment of the invention has been described above by way of example only, it will be understood by those skilled in the field that modifications may be made to the disclosed embodiment without departing from the scope of the invention, which is defined by the appended claims.

I claim:

1. A releasable tractor-trailer electrical signal transmission linkage, comprising:
    at least one flexible air brake hose having a tubular wall, tractor coupling means at one end of the hose for coupling the hose to a tractor air brake outlet, releasable trailer coupling means at the opposite end of the hose for releasably coupling the hose to a trailer air brake inlet;

a continuous conductive line embedded in the tubular wall of the hose and extending along the entire length of the hose, the line having a first end at the tractor coupling means and a second end at the trailer coupling means;

a connecting line connected to the first end of the conductive line and extending into the tractor for connecting an electronic communications unit in the tractor to the conductive line;

the releasable trailer coupling means comprising a first part secured to the trailer end of the air brake hose and a second part secured to the trailer;

electrical connecting means extending through the second part of said coupling means to connect the second end of the conductive line to an electronic signal transmitting unit on the trailer when the first and second parts of the coupling means are secured together; and the first and second parts of the releasable trailer coupling means comprising releasable mechanical connecting means for releasably securing the trailer end of the hose to the trailer air brake inlet, and having through bores for air passage through the releasable connecting means, the first part comprising an electrically conductive member connected to the second end of said conductive line, the second part comprising an electrically conductive member which is in contact with said first part when said first part is secured to said second part, the electrical connecting means comprising a conductive member secured to the second part and extending to the trailer transmitting unit, whereby the entire first and second parts of said coupling means comprise part of an electrical path from the second end of said conductive line to the trailer transmitting unit; and insulating means at the trailer end of the hose comprising an insulating pad between the second part of the coupling means and the trailer air brake inlet.

2. The path as claimed in claim 1, wherein the conductive line comprises an embedded wire braid in an air brake hose.

3. The path as claimed in claim 1, including insulator means at the tractor end of the hose for isolating the first end of the line from the tractor air brake outlet.

4. The linkage as claimed in claim 1, wherein said releasable trailer coupling means further comprises releasable mechanical connecting means for releasably connecting the first part to the second part, the first part of said coupling means including a first electrically conductive contact member connected to the second end of said embedded conductive line, the electrical connecting means including a second electrically conductive contact member on said second part positioned to contact said first electrically conductive contact member immediately when said first and second parts are secured together and a continuous and uninterrupted conductive path extending from said second electrically conductive contact member to the trailer transmitting unit.

5. A releasable tractor-trailer electrical signal transmission linkage, comprising:

at least one elongate air brake hose having tractor coupling means at one end for coupling the hose to a tractor air brake outlet and releasable trailer coupling means at the opposite end for releasably coupling the hose to a trailer air brake inlet;

a conductive line extending along the length of the air brake hose and having a first end at the tractor coupling means and a second end at the trailer coupling means;

insulating means at opposite ends of the hose for electrically isolating the opposite ends of the conductive line from the tractor air brake outlet and the trailer air brake inlet;

a connecting line connected to the first end of the conductive line and extending into the tractor for connecting an electronic communications unit in the tractor to the conductive line;

electrical connecting means for automatically connecting the second end of the conductive line to an electronic signal transmitting unit on the trailer as soon as the trailer end of the hose is mechanically coupled to the trailer air brake inlet by said trailer coupling means; and the releasable trailer coupling means comprising a glad-hand device having a first part secured to the trailer end of the hose and a second part secured to the trailer, the first and second parts comprising releasable mechanical connecting means for releasably securing the trailer end of the hose to the trailer air brake inlet, and having through bores for air passage through the releasable connection, the first part of said glad-hand device comprising an electrically conductive member connected to the second end of said conductive line, the second part of said glad-hand device comprising an electrically conductive member which is in contact with said first part when said first part is secured to said second part, the electrical connecting means comprising a conductive member secured to the second part of the glad-hand device and extending to the trailer transmitting unit, whereby the entire first and second parts of said glad-hand device comprise part of an electrical path from the second end of said conductive line to the trailer transmitting unit, and said insulating means at the trailer end of the hose comprising an insulating pad between the second part of the glad-hand device and the trailer air brake inlet.

6. The linkage as claimed in claim 5, wherein said air brake hose has a tubular wall and said conductive line is embedded in the tubular wall of said air brake hose.

7. The linkage as claimed in claim 6, wherein said conductive line comprises a wire braid.

8. The linkage as claimed in claim 5, including at least one fastener device for securing said first part of the glad hand device to an end wall of said trailer, the insulating pad and first part having aligned openings and the fastener device projecting through an opening in the trailer end wall and the aligned openings in said insulating pad and first part to secure the first part to the trailer end wall.

9. The linkage as claimed in claim 8, wherein said fastener device comprises a bolt having a shank projecting through said openings and having a projecting end, and a nut secured to the projecting end of said shank, and insulating means between the shank and nut and the first part of said glad hand device for insulating said first part from said fastener device.

10. The linkage as claimed in claim 9, wherein said insulating pad has at least one projecting boss coaxial with the opening in said insulating pad and projecting through the opening in said first part for insulating said first part from the shank of said bolt.

11. The linkage as claimed in claim 10, including an insulating washer mounted on said shank between said nut and the first part of said glad hand device.

* * * * *